(12) United States Patent
Matteo et al.

(10) Patent No.: US 7,646,315 B2
(45) Date of Patent: Jan. 12, 2010

(54) METHOD AND APPARATUS FOR KEYPAD MANIPULATION

(75) Inventors: Deborah A. Matteo, Schaumburg, IL (US); Prakairut Tarlton, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 183 days.

(21) Appl. No.: 11/422,890

(22) Filed: Jun. 8, 2006

(65) Prior Publication Data
US 2007/0285284 A1    Dec. 13, 2007

(51) Int. Cl.
*H03K 17/945* (2006.01)
(52) U.S. Cl. .................... 341/22; 345/168; 345/173
(58) Field of Classification Search ............. 341/22
See application file for complete search history.

(56) References Cited

U.S. PATENT DOCUMENTS 5,844,500 A * 12/1998 Beuk et al. ............ 340/825.56
6,574,083 B1 * 6/2003 Krass et al. ................ 361/115
7,271,361 B2 * 9/2007 Sugimura et al. .......... 200/341
2007/0236368 A1 * 10/2007 Chen ........................... 341/22

OTHER PUBLICATIONS

"Insert Mouse-Click or Mouse-Over Action Buttons", 2006, http://office.microsoft.com/en-us/assistance/HP052293061033.aspx, USA.
Aaron Weiss, "Introduction to Dynamic HTML: The Event Connection", Aug. 24, 1998, www.wdvl.com/Authoring/DHTML/Intro/events.html, USA.

* cited by examiner

*Primary Examiner*—Brian A Zimmerman
*Assistant Examiner*—Hung Q Dang

(57) ABSTRACT

A method and apparatus are for manipulating a keypad of an electronic device (100, 200). The electronic device has a plurality of tactile keys (110, 115, 1230, 125, 130). The method includes sensing a proximity of a object to one of the plurality of tactile keys and presenting, on an output (105, 205, 225) of the electronic device, a preview (410, 420, 515, 520, 615, 620, 710, 715, 810, 815) of an action that will take place upon pressing the one of the plurality of tactile keys.

2 Claims, 4 Drawing Sheets

FIG. 5  FIG. 1

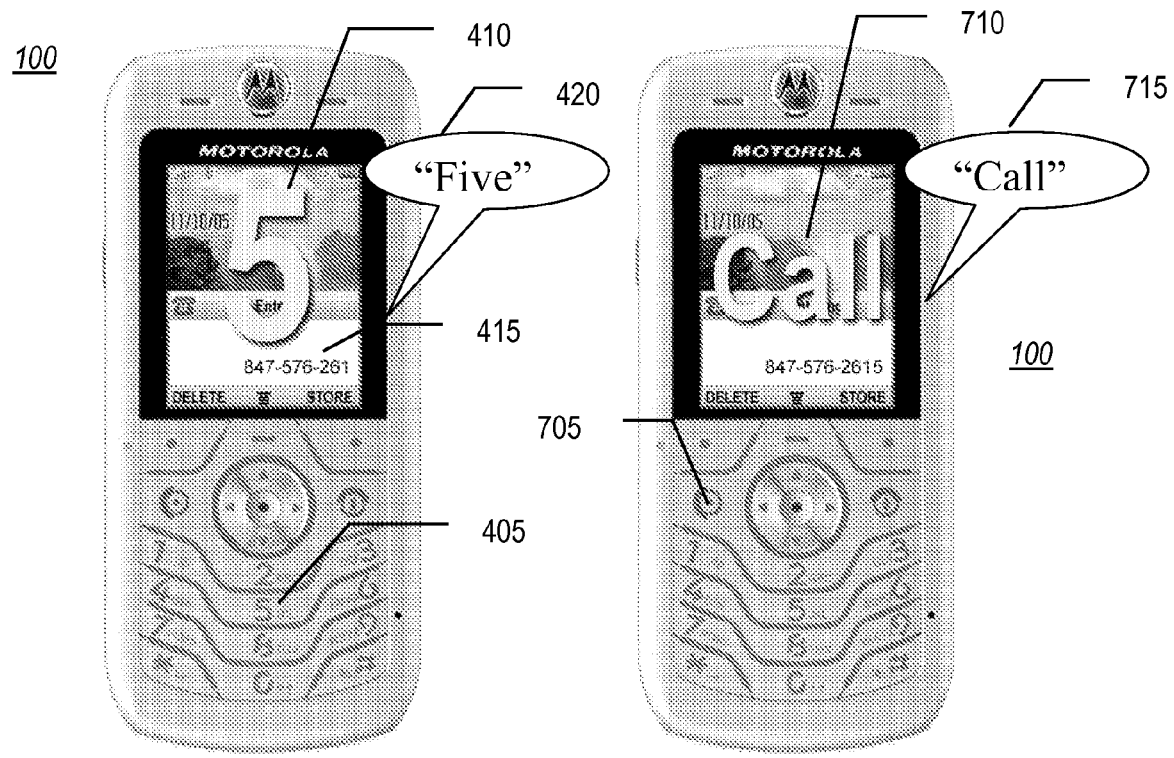
FIG. 4   FIG. 7

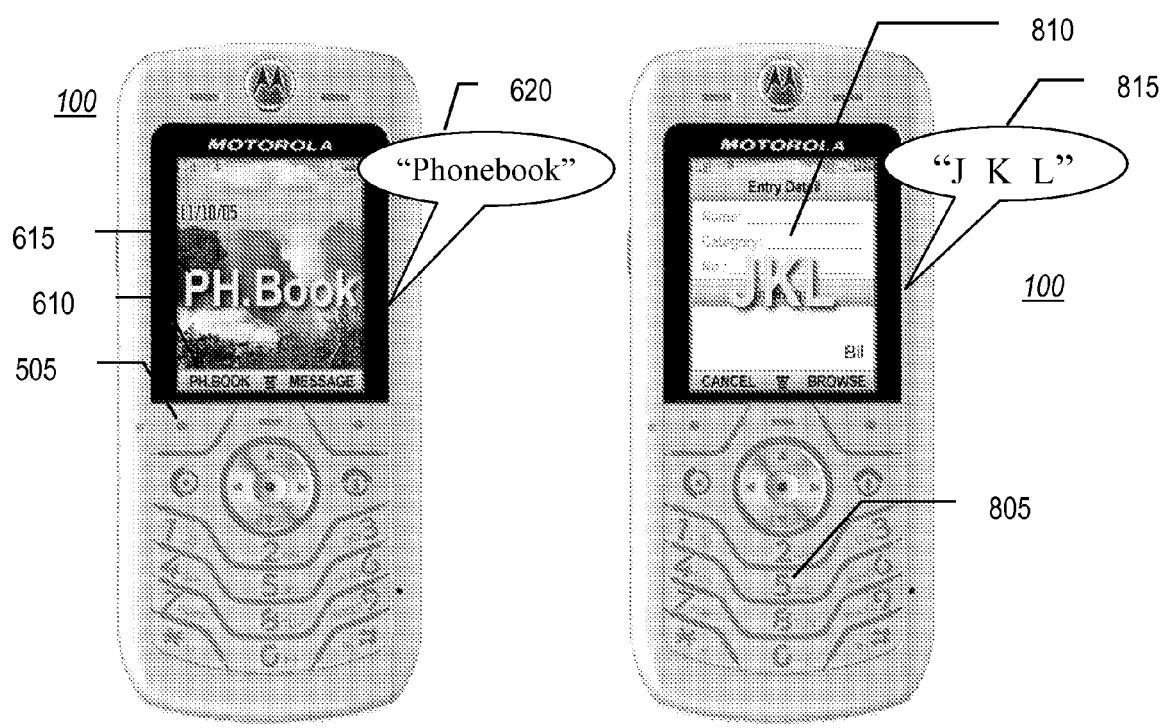
FIG. 6  FIG. 8

METHOD AND APPARATUS FOR KEYPAD MANIPULATION

FIELD OF THE INVENTION

The present invention relates generally to electronic devices, and in particular to human interfacing with electronic devices.

BACKGROUND

Many electronic devices are becoming quite small, and yet the need to enter more complex information into them grows. Many of these electronic devices have small displays with many pixels that allow the display of a lot of information, and small keyboards that include an augmented "telephone keypad" type of arrangement that is used for most data and command entry. A problem that arises at times is a difficulty of the user striking the correct key, because the keys are hard to see; either due to poor eyesight of the user or poor lighting conditions, or both.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of method and/or apparatus concepts and explain various principles and advantages of the embodiments.

FIGS. 4-8 are plan views of the electronic device operating in accordance with the techniques described with reference to FIGS. 1-3.

Figure 1:
FIG. 1, a plan view of a cellular telephone is shown, in accordance with some embodiments of the concepts.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the concepts.

DETAILED DESCRIPTION

Before describing in detail embodiments of the method and/or apparatus concepts, it should be observed that the embodiments reside primarily in combinations of method steps and apparatus components related to keypad manipulation for electronic devices. Accordingly, the apparatus components and method steps have been represented where appropriate by conventional symbols in the drawings, showing only those specific details that are pertinent to understanding the embodiments of the concepts so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a plan view of a cellular telephone 100 is shown, in accordance with some embodiments of the concepts. This cellular telephone is representative example of a large variety of electronic devices that have some of the same features as this example. Some examples of such electronic devices are remote controls, personal digital assistants, GPS receivers, some wire connected telephones, and some audio components. The cellular telephone 100 comprises a display 105, three soft keys 110, 115, 120, seven function keys including a "call terminate" key 115, and twelve alphanumeric keys including a "6-N-M-O" key. The six function keys not named above are a "call connect" key, which serves to answer or place a call, a right key, a left key, an up key, a down key, and a select key (in the center of the right, left, up, and down keys). The cellular telephone may further comprise switches not illustrated in FIG. 1, such as switches on the sides and/or back of the cellular telephone 100, and may comprise other features, such a speaker, a microphone, a vibrator, and connectors. The soft keys are so named because their functions are defined by icons, words, or symbol combinations at the bottom of the display 105, which in the example show "delete", and icon for "menu", and "store".

The keys that have been described above may be of the type that are categorized as tactile keyswitches, which is to say that an electrical signal is generated in response to activation of the key by pressure. In some embodiments, a tactile experience of a click or snap may be felt in conjunction with activation of the key. The terms "in conjunction with" mean, in the context of this document, sufficiently simultaneous that an untrained user typically concludes that the activation and tactile experience are simultaneous. In some embodiments, the tactile experience may be the cessation of movement. In some embodiments, the tactile experience may be no more than a very light touch of a key surface.

Associated with each key is a proximity detection sensor that is designed to sense an object or finger when it is close to or touching the associated key, but before enough pressure is exerted on the key to activate the key. The proximity sensor could be of any suitable technology, and may differ depending upon the technology used to provide the tactile experience and the object that is to be sensed. For example, when the electronic device uses a tactile experience that is a noticeable click or snap, a proximity sensor that relies on a finger touching the key surface, such as certain capacitive sensors, may be acceptable. In another example, a keypad could be designed that uses a location of an object in an x-y plane determined by optical transmitters located along two sides of a rectangular display, pointed towards optical sensors on the two opposing sides of the rectangular display. Further, there could be means of determining an actual touching of the display surface. Thus, a key activation could be generated by the touching of the display surface, and the key could be identified by the location of the finger or object that intercepts one or more light beams transmitted by the optical transmitters. Properly designed, interception of the light beams could be used prior to the touching as a proximity detector. This may require, for example, the light emitters and sensors to be designed to be operable for a depth of approximately one half centimeter above the surface of the display.

Figure 2:
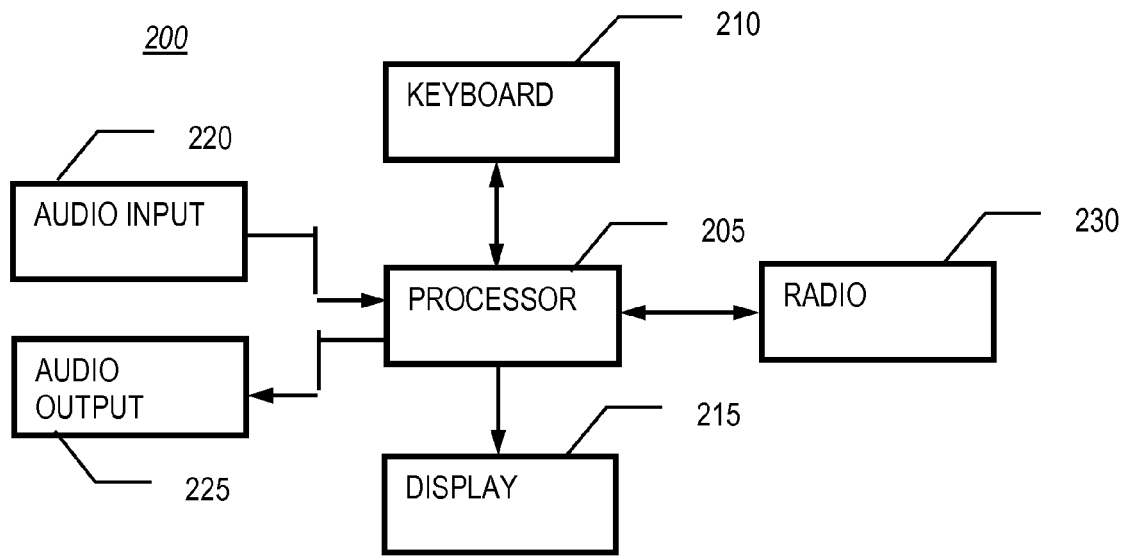
FIG. 2, a block diagram of an electronic device is shown, in accordance with some embodiments of the concepts.

Referring to FIG. 2, a block diagram of an electronic device 200 is shown, in accordance with some embodiments of the concepts. This electronic device is representative of many electronic devices, including the electronic device 100. The electronic device 200 comprises a processor 205 that is coupled to a keyboard 210, a display 215, an audio input 220, and audio output 225, and a radio 230. All of these items are powered by a power supply, not shown in FIG. 2. The radio 230 may comprise a cellular radio including appropriate antennas. The keyboard 210 has at least some of the features described above with reference to FIG. 1. The display 205 is preferably a graphic display, although it need not be a color display.

The audio input 220 is a microphone and the audio output 225 may be one or two speakers and/or sound devices such as single tone alert transducers. The electronic device 200 may have other features not illustrated—LED indicators, vibrator, audio connectors, etc. The processor 205 may comprise various types of memories and one or more central procession units. The processor 205 includes programmed instructions that perform many of the functions of the electronic device 200. Although the processor is shown as one function in the block diagram, it will be appreciated that the processor 205 may be distributed. For example, the processing functions of the radio 230 may be performed by a processor dedicated to the radio; the processing functions of the audio input 220, which may include, for example, speech recognition by a processor dedicated to the audio input 220. Similarly the display may have a processor dedicated to storage of display images and supplying display drivers with necessary pixel related information. Such a dedicated processor could, in some embodiments, handle additional functions such as text to image conversion, and, for example, could also handle keyboard inputs and the functions described herein for improved human interface. However, in many embodiments the functions described herein for improved human interface could be preformed by processor 205, which may be referred to as a control processor of the electronic device 100.

Figure 3:
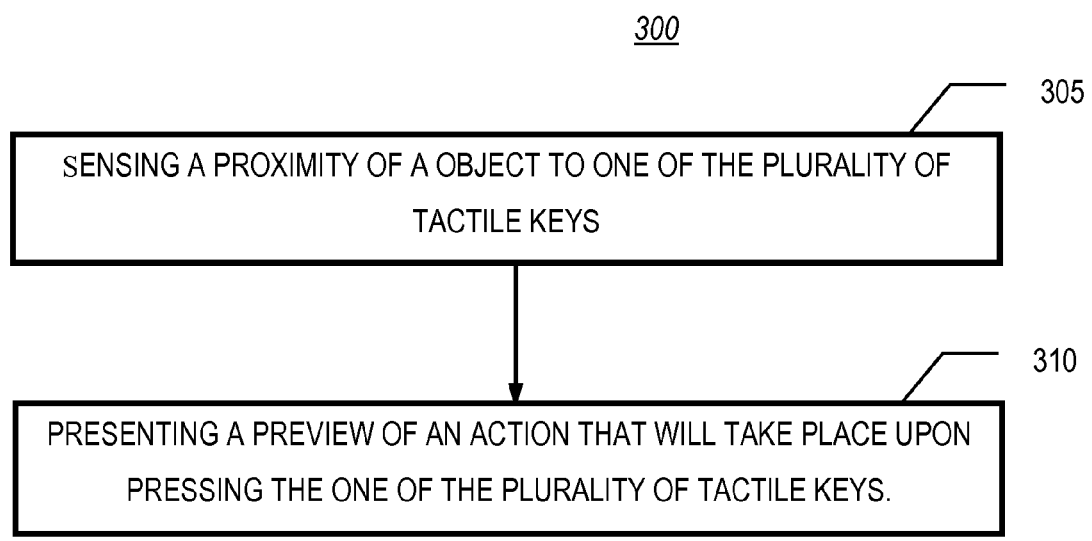
FIG. 3 is a flow chart that shows steps of a method used in the electronic devices of FIGS. 1 and 2, in accordance with some embodiments of the concepts.

Referring to FIG. 3, a flow chart 300 shows steps of a method used in the electronic devices 100, 200, in accordance with some embodiments of the concepts. At step 305, a proximity of a object to one of the plurality of tactile keys is sensed. Some examples of how this can be done are given above with reference to FIG. 1. At step 310, a preview is presented of an action that will take place upon pressing the one of the plurality of tactile keys. The action may be, for example, an entry of a character or a command.

Presenting the preview of the action at step 310 may comprise presenting a visual and/or audible presentation that evokes the action, for which several examples follow.

In a first example, a visual presentation comprises presenting a first character image of a character that will be entered upon pressing the one of the plurality of tactile keys. An example of this is shown in FIG. 4, in which the key 405 labeled "5 A B C" is activated. In this example, a telephone number 420 is being entered, so the action of the key is constrained to be the entry of a "5". As the finger or object that is going to activate the key comes in proximity to the key, and before the key is activated, a large "5" 410 appears in the center of the display, covering whatever image may exist behind the pixels that form the large "5". This first character image of the "5" that appears is many times larger than the second image of the "5" that will appear in the display within the phone number being entered. More generally, according to these concepts, the first character image differs in at least one of size, location, color, intermittency, and font from a second character image that will appear after the pressing of the one of the plurality of tactile keys. In this same example, when the first character image is presented, an audible output 420 saying the character "5" is emitted from a speaker of the electronic device 100. The electronic device 100 may be configurable by the user to select either the image presentation or the audible presentation, or both.

In a second example, the visual presentation is a character sequence that evokes an action that is a command. Referring to FIG. 5, an example of an action that is a command is shown. In this example, the left hand soft key 505 is approached by a finger in order to be activated. The left hand soft key 505 is identified by the soft key identifier 510 as "Delete", so a large set of characters 515 spelling "Delete" is presented in the display, covering portions of the image that would otherwise being presented on the display, and/or the word "Delete" 520 is emitted by the speaker of the electronic device 100. FIG. 6 illustrates another command evoked by the same soft key, but in this instance the soft key 505 is identified by the soft key identifier 610 as "Ph. Book", so a large set of characters 615 spelling "PH. Book" is presented in the display, and/or the words "Phone Book" 620 are emitted by the speaker of the electronic device 100.

In a third example, the visual presentation is an icon that evokes an action that is a command. In this example, the icon may be similar to an icon on the one of the plurality of tactile keys. Referring to FIG. 7, the call connect key 705 is approached in order to be activated. Since no call is in progress, this is taken to be a "Call" command, so a large icon 510 indicating "Call" is presented in the display, and/or the word "Call" 715 is emitted by the speaker of the electronic device 100.

In a fourth example, the visual presentation comprises a set of characters, one of which will be entered upon pressing the one of the plurality of tactile keys one or more times within a predetermined duration, and wherein a character within the set of characters that represents the character that will be entered differs in at least one of size, location, color, intermittency, and font from a second character presentation of the character that appears after the pressing of the one of the plurality of tactile keys for the one or more times. Referring to FIG. 8, the key 805 labeled "5 J K L" is approached by a finger or object in order to be activated. Since the keypad is in an alphabetic mode, this key is used to select J, K, or L as determined by a number of times it will be activated (within a short duration), so a large set of letters 810 indicating "J K L" is presented in the display, and/or the letters "J K L" 815 are audibly presented by the speaker of the electronic device 100. In embodiments of this example, the electronic may be configurable to maintain the presentation of the set of characters for the predetermined duration.

It will be appreciated that, as described above, embodiments of the invention described herein may be comprised of one or more conventional processors and unique stored program instructions that control the one or more processors to implement, in conjunction with certain non-processor circuits, some, most, or all of the functions of the embodiments of the concepts described herein. The non-processor circuits may include, but are not limited to, a radio receiver, a radio transmitter, signal drivers, clock circuits, power source circuits, and user input devices. As such, these functions may be interpreted as steps of a method to improve the human interface to an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the concepts have been described. However, one of ordinary skill in the art appreciates that various modifications and changes can be made to those concepts without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An electronic device, comprising:
   a plurality of tactile keys;
   a plurality of non-touch proximity sensors, each proximity sensor associated with one of the plurality of tactile keys;
   an output; and a processing system that
   senses a proximity of a object to one of the plurality of tactile keys before it is touched; and
   presents, using the output, a preview of an action that will take place upon pressing the one of the plurality of tactile keys; wherein the preview comprises a presentation of a set of characters, one of which is entered upon pressing the one of the plurality of tactile keys more than one time, and each of the characters within the set of characters is larger than a second character presentation that will appear after the pressing of the one of the plurality of tactile keys.

2. A method used in an electronic device having a plurality of tactile keys, comprising
   sensing a proximity of a object to one of the plurality of tactile keys before it is touched; and
   presenting a preview of an action that will take place upon pressing the one of the plurality of tactile keys; wherein presenting a visual presentation comprises presenting a set of characters, one of which is entered upon pressing the one of the plurality of tactile keys one or more times, and each of the characters within the set of characters is larger than a second character presentation that will appear after the pressing of the one of the plurality of tactile keys.

* * * * *